Aug. 7, 1956 P. K. BEEMER ET AL 2,757,619
POWER TAKE-OFF MECHANISM FOR RAILROAD CARS AND THE LIKE
Filed Jan. 26, 1952 4 Sheets-Sheet 1
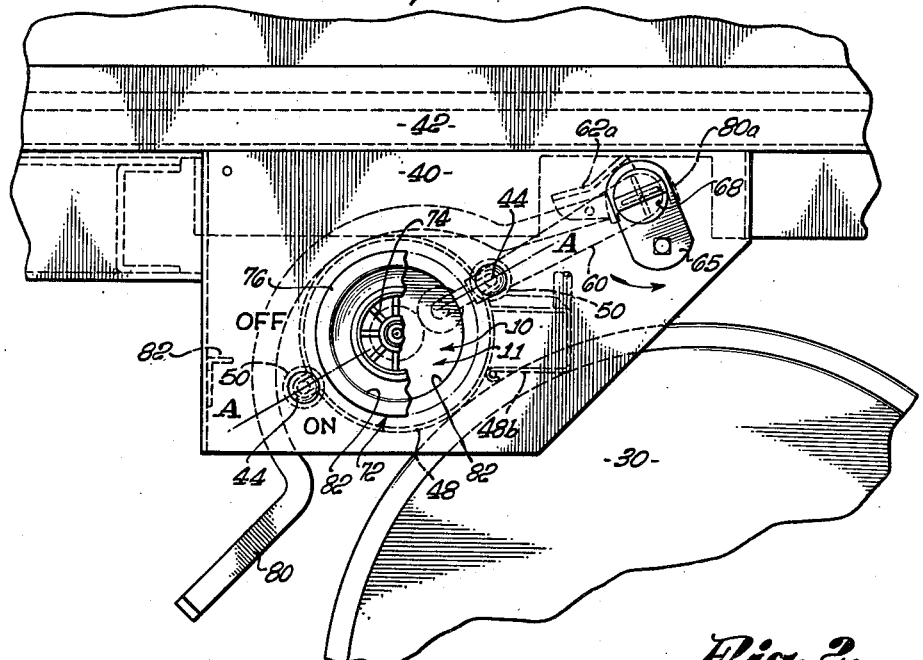
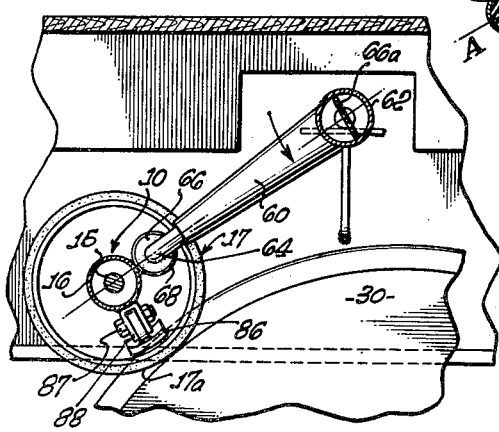
PAUL K. BEEMER,
HENRY O. FUCHS,
PAUL Z. ANDERSON,
INVENTOR.
BY
Barbalow & Scanlebury
ATTORNEYS.

Aug. 7, 1956 P. K. BEEMER ET AL 2,757,619
POWER TAKE-OFF MECHANISM FOR RAILROAD CARS AND THE LIKE
Filed Jan. 26, 1952 4 Sheets-Sheet 2

PAUL K. BEEMER,
HENRY O. FUCHS,
PAUL Z. ANDERSON,
INVENTORS.

BY
Barkelew & Scantlebury
ATTORNEYS.

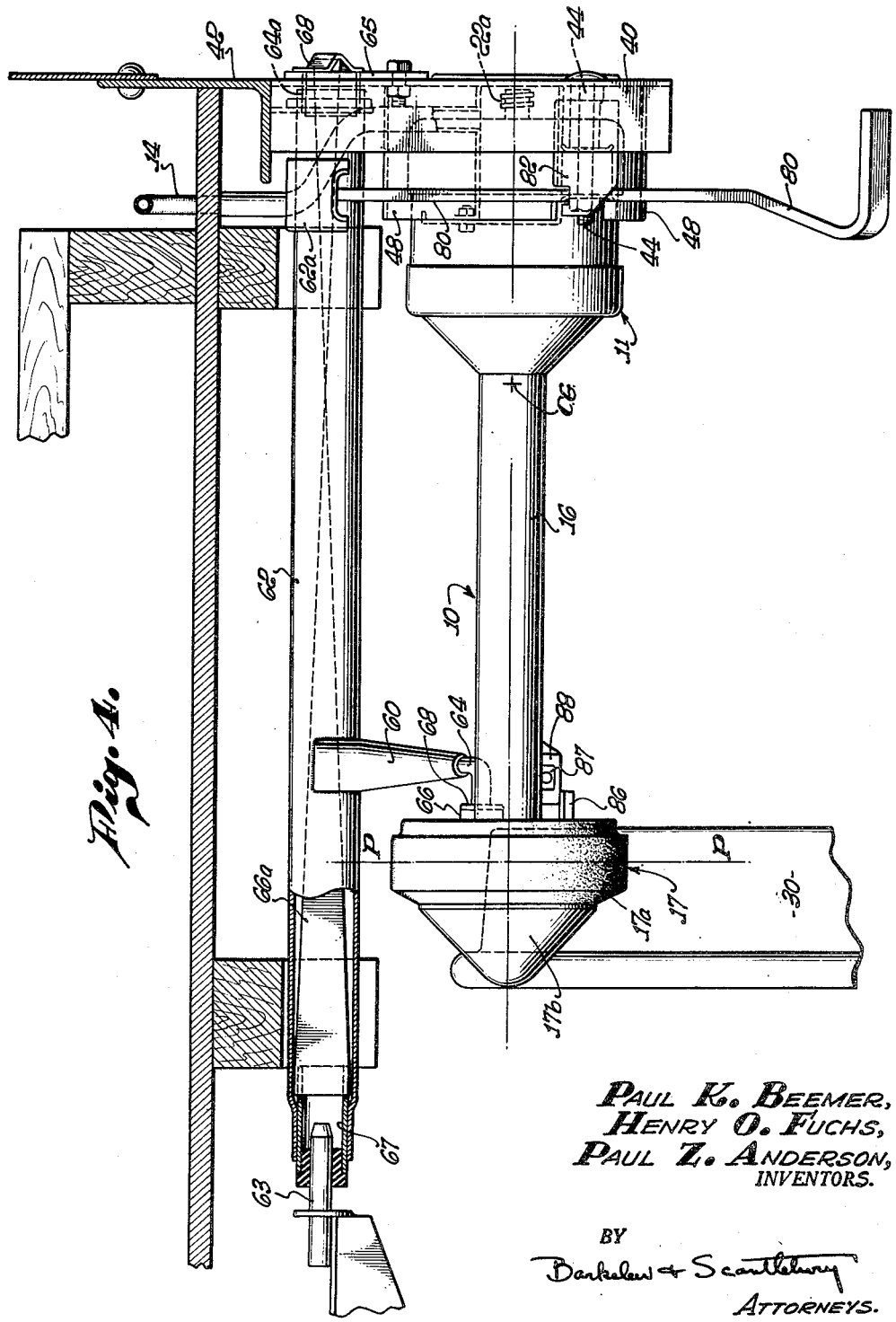

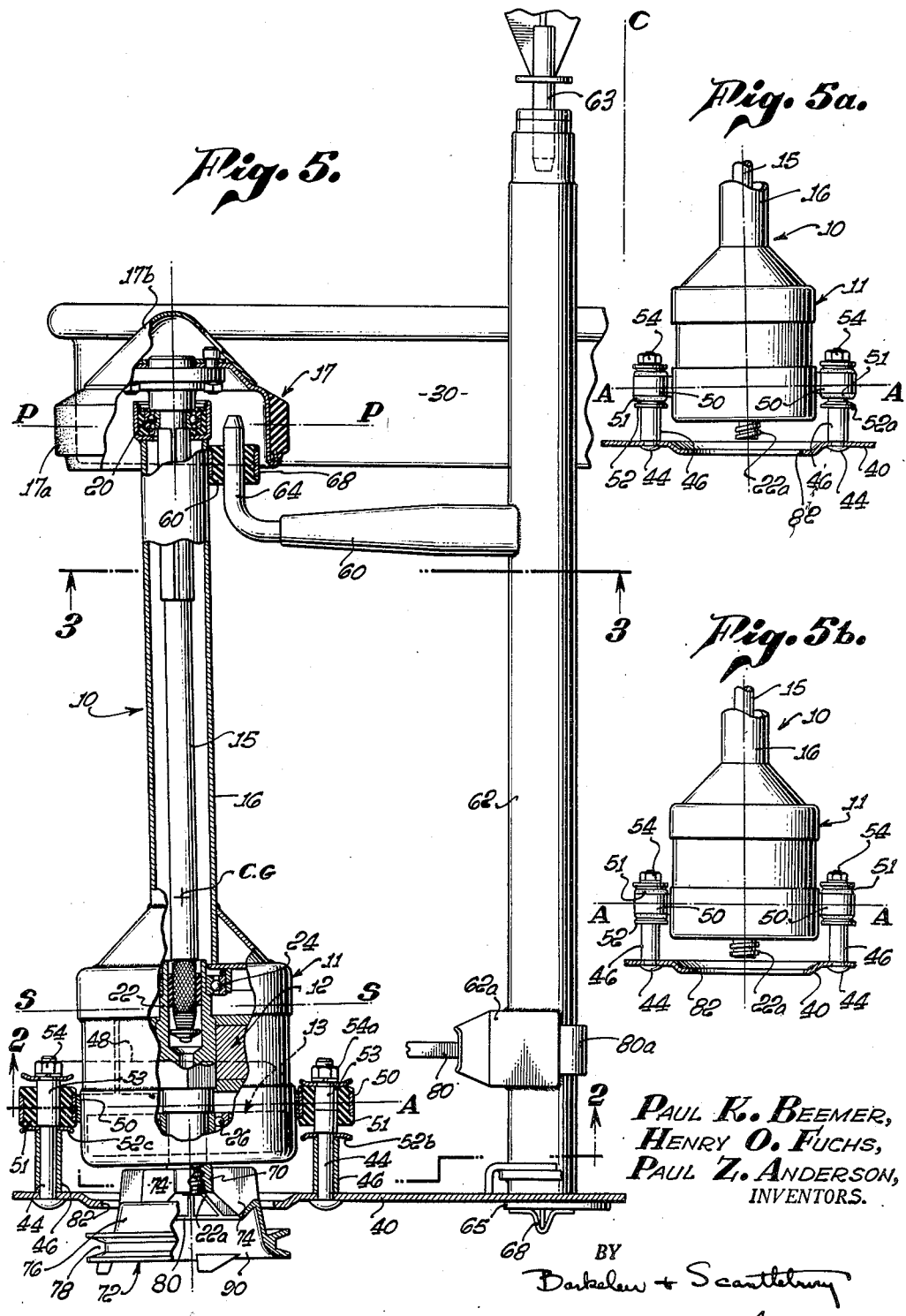

United States Patent Office 2,757,619
Patented Aug. 7, 1956

2,757,619

POWER TAKE-OFF MECHANISM FOR RAILROAD CARS AND THE LIKE

Paul K. Beemer, Pasadena, Henry O. Fuchs, Los Angeles, and Paul Z. Anderson, Whittier, Calif., assignors to Preco Incorporated, Los Angeles, Calif., a corporation of California Application January 26, 1952, Serial No. 268,428

11 Claims. (Cl. 105—114)

This invention has to do with mechanisms for taking power from a wheel and axle element of the running gear of a vehicle, such for instance as that of a railroad car, for the purpose of supplying power for operation of accessories, for example air circulation apparatus.

The invention relates more particularly to power take-off mechanism which is hung on a part of the car structure with relation to which the wheel and axle element moves vertically under varying loads and under vertical forces generated in travel.

As will be readily understood from consideration of the following description, the mechanism may be hung or mounted on any suitable part of the car structure, including the truck frame. However, it is preferred at present to mount it on the car body, with relation to which the wheel-and-axle element has swivelling as well as vertical movement. To provide for the relative movements necessary to follow the movements of the wheel-and-axle element, a power take-off unit is arranged in a position with its longitudinal axis substantially parallel to the normally positioned axis of the wheel and axle element. That unit has at one end a power take-off element preferably in the form of a traction roller which tractively engages a part which rotates with the wheel-and-axle element, preferably a car wheel itself. At or near its outer end the take-off unit is mounted on the car structure primarily to swing about an axis which is generally at right angles to the car wheel axis—that is, to swing in a plane which is generally radial of the car wheel axis.

Features and accomplishments of the invention have to do with the mounting of such a take-off unit in such manners as both to minimize and to absorb shocks to which such mountings are subjected, particularly where, as here, the take-off unit includes as a component part a relatively heavy electric generator. In accomplishing that feature, the unit is hung entirely on mountings of rubber or similar material so as to have a limited amount of play in which the involved forces are opposed by rubber distortion. Hung thus at its primary suspension axis on rubber, the traction end of the unit is then guided substantially in its said swinging plane by a swinging guide arm, through which a spring force is also preferably applied to supply the necessary tractive force.

Further features of the invention have to do with minimizing inertia of the take-off unit in its movements following the car wheel, so that the spring force necessary for close wheel following need be no greater than necessary to supply the desired traction pressure; and with provisions for maintaining that traction pressure substantially constant throughout the movements of the take-off unit.

Other features and accomplishments will appear in the following detailed description of illustrative embodiments of the invention, reference for that purpose being had to the accompanying drawings, where:

Fig. 1 is a side elevation showing an illustrative form of the invention in a typical relation to a car structure and running gear;

Figs. 2 and 3 are sections, in the same aspect as Fig. 1, taken on line 2—2 and 3—3 of Fig. 5;

Fig. 4 is an enlarged end view of the parts shown in Fig. 1, with parts in section for purposes of illustration;

Fig. 5 is a plan of the parts shown in Figs. 1 and 4, at the same scale as Fig. 4;

Figs. 5a and 5b are details, similar to certain parts of Fig. 5, but showing illustrative variants in the primary mounting of the take-off unit.

Figure 3A:
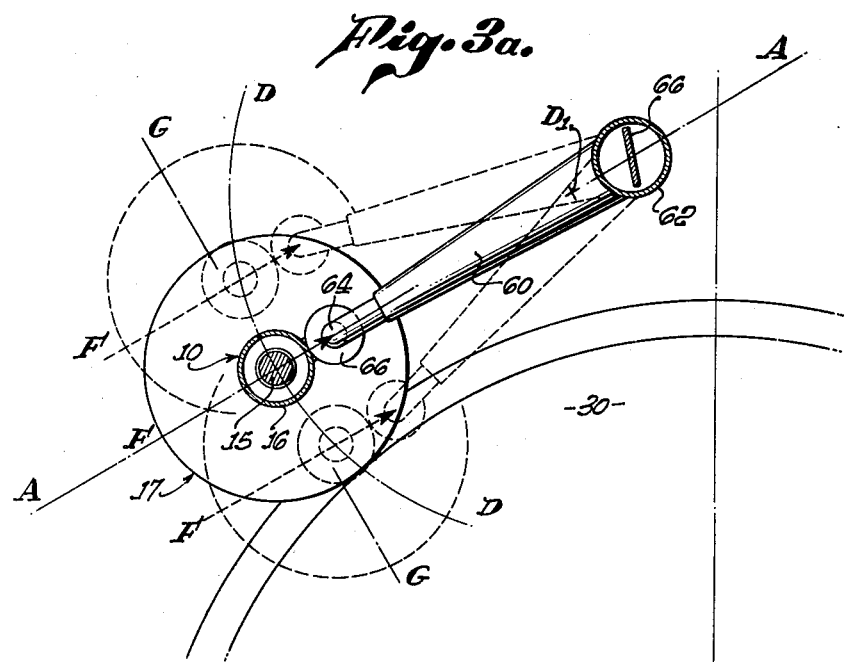
Fig. 3a is an enlarged schematic view similar in showing and aspect to Fig. 3.

In the illustrative embodiment of the invention shown in the drawings, a generator and power take-off unit 10 comprises a main housing 11 in which a generator, indicated at 12 in Fig. 5, and a switching mechanism, indicated at 13, are carried. In the present embodiment the generator is of polyphase A. C. type, and switching mechanism 13, in close physical association with the generator is actuated by generator rotation in opposite directions to keep the phase sequence always the same in the several conductors of output cable 14, regardless of direction of generator rotation. However, insofar as the present invention is concerned, generator 12 may be of any type and may or may not have such a switching mechanism associated with it.

And in certain broad aspects of the invention, the generator may be considered broadly as a power transmission element, transmitting power derived from the running gear to any accessory in any manner. In the preferred embodiment here shown generator 12 is driven directly by the outer end of a shaft 15 housed in a housing tube 16 and carrying a take-off traction roller 17 at its inner end. Housing tube 16 and main generator housing 11 form a rigid and preferably integrated housing in which shaft 15 is journalled in a bearing 20 at its roller end. The generator rotor shaft 22 is journalled in bearings 24 and 26 in main housing 11, and shaft 15 is rotatively coupled to and carried by, the generator shaft. Insofar as concerns the present invention shaft 15 may be journalled in the housing in any suitable manner and may be rotatively coupled to generator shaft 22 in any suitable manner. Preferably the two shafts are coaxial, and in that preferred arrangement, may for the purposes of the present invention be regarded as one shaft. The preferred manner of coupling the two shafts co-axially is the subject matter of the application of Paul Z. Anderson, Serial No. 265,454 filed January 8, 1952, now Patent No. 2,715,822. The roller 17 which rides the periphery of car wheel 30 is similar in form and function to the similar roller described in Patent No. 2,519,170. Its details of structure are not pertinent to the present invention except that, being constructed with a pressed sheet metal body with a peripheral rubber tread, it is of comparatively light weight, so that the center of mass of the whole generator and take-off unit lies close to the generator; at about the point denoted by C. G. close to the relatively heavy generator.

In certain broad aspects of the invention the tubular shaft and generator housings, in which the shaft and generator are preferably enclosed, may be looked at as a shaft and/or generator carrier on which the shaft or shafts are journalled.

Further, considering the described take-off and generator unit as subject to transverse forces (those due for instance to the relative vertical movements of car wheel 30) applied to the traction roller at a center of percussion in a medial plane of the roller (as plane P—P in Figs.

4 and 5), the corresponding neutral suspension point of the unit on which no displacement forces will be exerted lies close to the heavy element, the generator, and about in the plane designated S—S in Fig. 5.

The primary suspension of the described unit is on an axis transverse of the length of the unit close to the center of its heaviest (and most delicate) element, the generator, and close to the described neutral suspension point and the center of mass. Such a transverse axis is designated by A—A in Figs. 2 and 5, and the unit is suspended to have, and to be substantially or yieldingly restricted to, swinging movement about that axis. Preferred arrangements for so mounting the unit will be described shortly. With the unit mounted to swing on that axis, close to both the neutral suspension axis and the center of mass, the mountings at that axis are subjected to little shock, and the inertia involved in swinging about that axis to follow the relative movements of the car wheel is relatively small.

A flanged mounting plate 40 is suspended from the car body by having its upper edges welded to a side sill or other structural body member 42. The plate is secured to the car body preferably flush with the body's outer surface, and in a position, with relation to the normal position of a car wheel 30, such as shown in Fig. 1. The plate 40 (see more particularly Figs. 1, 2 and 5) carries two mounting bolts 44 which project horizontally inwardly of the plate and are surrounded and supported by sleeve formations 46. These sleeve formations are formed integrally with a cylindric cowl formation 48 which spacedly surrounds at least the outer portion of generator housing 11, for purposes to be later described. The whole cowl formation, including the sleeves 46, is welded to the inner face of plate 40, and the sleeves thus form rigid supports as well as spacers surrounding the bolts.

Figure 6:
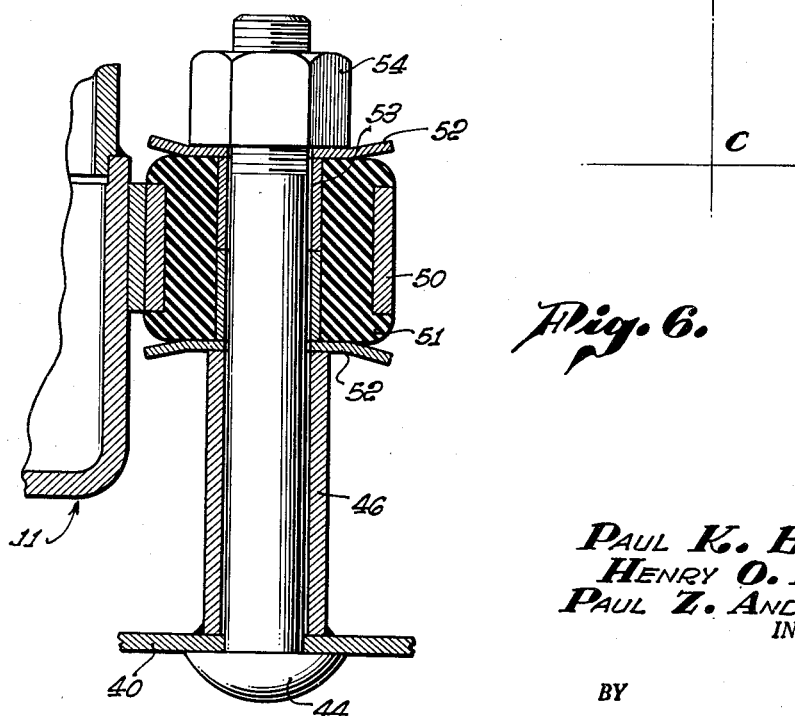
Fig. 6 is an enlarged sectional view showing typical and illustrative structure of one of the primary rubber mounting elements shown in Fig. 5.

Generator housing 11 has two rubber grommetted suspension lugs located on the suspension axis A—A. Each of these lugs comprises (see Fig. 6) a metal strap 50 integrated with housing 11, and an internal grommet 51, of medium soft rubber or similar material, which overhangs the lug strap in length. A pair of ferrules 53 with washer heads 52 fit in the grommet and the heads confine the grommet ends. The mounting bolts extend inwardly from sleeves 46 through the grommet ferrules and have nuts 54 set on their inner ends to confine the headed ferrules between the nuts and the inner ends of sleeves 46. The preferred details of the nature of those confinements in directions endwise of the bolts will be discussed later. At the moment it is observed that, assuming the rubber grommets to be snugly confined endwise, the unit 10 is mounted to swing about axis A—A, without serious opposition by the forces generated by grommet distortion, through all required angles above and below its normal position. That normal or medial position of unit 10 is with its longitudinal axis horizontal or substantially so, and substantially parallel to the axis of car wheel 30 in its normal, straight ahead running, position. That position of the car-wheel axis is indicated by line C in Fig. 5. The orientation of mounting axis A—A in the aspect of Fig. 1 is such that the plane G—G (see Fig. 3a) in which the unit swings about axis A—A, is preferably radial or somewhat nearly radial of car wheel axis C; that is, plane G—G is so oriented that, swinging in that plane, the traction roller has at least a large component of movement toward and from the normally positioned wheel axis. And the length of the unit 10, mounted as described and shown, is such that roller 17 rides the car wheel in normal medial position about as shown in Fig. 4. Changes in the relative elevations of the car body and of the traction roller 17 riding the car wheel normally call for displacement of the roller above and below its medial position not more than about two and one-half inches. That corresponds to a total swing angle (the unit as here shown has a length dimension of about 24" between A—A and P—P) of about 12°, easily allowed by the grommets.

As will be seen, the axis A—A preferably lies in a plane which is substantially normal with respect to axle axis C (Fig. 5) with axis A—A extending along that plane in a direction which is non-radial with respect to axis C (Fig. 3a) so that the swinging movement of the take-off roller 17 about axis A—A is generally, or effectively, in a plane radial of the wheel axis. In order not to depend solely on the mountings on the axis A—A for preventing or limiting movement of the traction roller 17 in directions tangential of the car wheel, the take-off unit is also provided with a secondary suspension in the form of a swinging arm pivotally mounted with respect to the car body with its swinging end connected to the take-off unit preferably at a point close to the take-off roller (or in any case, at a point substantially spaced along the length of the unit from axis A—A) and guiding the swinging end of the unit in an arcuate line of movement which approximates a line lying in the plane indicated by G—G in Fig. 3a—a plane determined by the longitudinal axis of the take-off unit and by a line intersecting axis A—A and normal to that axis and the unit axis.

The arrangement shown in the drawings comprises an arm 60 radial of a shaft 62 which is mounted on the car body on an axis substantially or at least approximately parallel to the longitudinal axis of the take-off unit in its medial position and lying at least approximately in a plane determined by the medial position of the take-off unit axis and the axis A—A. In the preferred arrangement shown in the drawings, arm 60 is connected to the take-off unit by having its outer end at 64 turned at a right angle to the radial length of the arm and entered in a rubber grommet 66 in a lug 68 attached to shaft housing 16 at a point near its inner swinging end. Arm 60 then guides the swinging end of the unit in an arcuate movement along such a circular line as D—D in Fig. 3a centered at D₁.

The composite movement of the take-off and generator unit may then, to a sufficient degree of approximation, be regarded for the purposes of this description as involving (a) swinging movement about the mounting axis A—A in a plane normal to that axis, and (b) swinging movement in the plane of Fig. 5 about a point located on axis A—A. And the mountings on the axis A—A are constituted so as to allow not only movement (a) but also, as set out below, to allow movement (b), and further, in a preferred arrangement, to beneficially modify the effective traction pressure of the take-off roller on the car wheel, to keep that pressure nearly uniform throughout the swinging angle of the unit.

Arm 60 not only guides the swinging end of the take-off unit but also preferably applies a spring pressure urging the traction roller 17 into tractive engagement with the car wheel. For that purpose the spring arrangement of Patent No. 2,519,170, and, more particularly, the spring and shaft mounting and arrangement of the application of Paul Z. Anderson Ser. No. 163,776 filed May 23, 1950, is utilized. In that arrangement, shaft 62 is hollow and is rotatively mounted at its inner end on a pin 63 carried by a bracket attached to the car underframing. The outer end of hollow shaft 62 is rotatively carried on an inwardly projecting plug part 64a of a spring setting member 65 mounted on supporting plate 40 with the plug projecting through the plate. One end of a flat torsion spring 66a is held in an insert 67 set in the inner end of shaft 62. The other end of that spring engages a notch formation 68 which forms a part of member 65. The spring is set to the desired degree of torsion by twisting member 65 (counter-clockwise in Fig. 1) and setting the member with a bolt. The spring then acts to urge arm 60 in the direction indicated by the arrow in Fig. 3, urging roller 17 into tractive engagement with the car wheel.

If we now consider Fig. 3a, the primary forces acting on take-off roller 17 tending to press it into tractive engagement with the car wheel are (1) the weight of the take-off, generator unit pivoted on axis A—A (Fig. 5) and (2) the pressure normal to the radial length of arm 60 due to the torque exerted by spring 66. The gravitational force in the present design is intentionally and desirably comparatively small, due to the mass center of the unit being near the axis A—A. The effective traction pressure due to gravitation also varies little throughout the movements of the take-off roller; being affected only by a function (co-sine) of the varying angle between the vertical and a line passing through the centers of the car wheel and the take-off roller. The tractive pressure due to gravity can be considered as substantially constant.

The effective traction pressure due to the spring torque varies first with the varying angular position of arm 60. Using a suitably soft spring, the movement of arm 60 through a maximum of 14° or 15° does not cause any large variation in the force applied by arm 60 at point 64 in a direction normal to the arm. And the final effective traction pressure exerted on the take-off roller by the spring is further varied only by the sine of the angle between the arm and a line through the centers of the car wheel and traction roller. If unaffected by any other forces the traction pressure due to gravity and the spring torque does not vary more than about seven pounds either way from a desired median pressure which, in this design to drive a generator of about two kw. at 3000 R. P. M., can be taken to be about 70 lbs. Of that effective traction pressure about 25 lbs. in this design is due to gravity, and the effective spring pressure of 45 lbs. is ample to cause the take-off roller to closely follow rapid changes of car wheel position.

As has been said, movement of the roller end of the unit along arc D—D, instead of in the plane G—G, requires a swinging movement of the unit in the plane of Fig. 5 about a point on axis A—A, and the hanging of the unit on that axis may be designed either to allow full freedom of swinging in the plane of Fig. 5 or, with rubber grommet mountings allowing no such free movement, to exert grommet distortion forces that keep the effective traction pressure within about the same small range of variation as above stated.

A mounting arrangement for allowing substantially full freedom for swinging in the plane of Fig. 5 is shown somewhat schematically in Fig. 5a. In that figure the left hand grommet 51 is shown as snugly or tightly held longitudinally between the two ferrule heads 52 and spacer sleeve 46 and nut 54 on bolt 44. The right hand grommet 51 is however shown as spaced from the ferrule head 52a so that that grommet is allowed a free movement longitudinally before contacting head 52a. Assuming that Fig. 5a shows the position of the parts corresponding to the full line position of Fig. 3a—that is, the position in the swinging movement where arm 60 is in the plane determined by A—A and the axis of shaft 62—then movement of the roller end of the unit up and down from that position entails only a swinging movement in the plane of Figs. 5 and 5a in clockwise direction. And the spacing between ferrule head 52a and grommet 51 is made to allow that swinging freely. At the same time, the left hand grommet 51 of Fig. 5a holds the whole unit against lengthwise translation in the plane of Fig. 5. Due to the described freedom of swinging in that plane, the traction pressure of roller 17 on the car wheel remains substantially constant, as before explained.

Another arrangement of the mounting of the unit is illustrated in Fig. 5. There the right hand spacer sleeve 46 is shown as being shorter than the left hand one. The right hand nut 54a is set down farther than the left hand one 54. The arrangement is such that, in the medial position of the unit (full lines in Fig. 3a) with arm 60 holding the roller end of the unit against movement to the right in Fig. 5, the nut 54a and its ferrule head 52b put the right hand grommet 51 under longitudinal compression between head 52b and the mounting lug 50. And, seeing that arm 60 does not restrict longitudinal movement of the unit, the left hand grommet 51 is put under compression between its lug 50 and the ferrule head 52c which bears against the end of the left hand spacer sleeve 46. A couple is thereby set up tending to rotate the unit clockwise in the plane of Fig. 5, which rotation is resisted by arm 60 and its mounting. A force, indicated by F in Fig. 3a is consequently exerted by the roller end of the unit against the outer end of arm 60, along a line which, as viewed in Fig. 3a, is paralled to the axis A—A. In other words, in the medial position of Fig. 3a, the unit is pre-loaded to exert that force F, by the described settings of the mounting grommets 51.

So far the description has proceeded on the assumption that, in the medial position of Fig. 3a (position taken by the unit when the car is under an average load) the longitudinal axis of the unit is parallel to the car-wheel axle, so that in such position the plane of roller 17 is parallel to the car-wheel plane, as viewed in the aspect of Fig. 5. And that the plane G—G in Fig. 3a is the plane in which the unit would swing about axis A—A (uninfluenced by arm 60) if the grommets 51 were both snugly held and were not pre-stressed. Such an arrangement of the grommets is shown in Fig. 5b, with the swinging axis A—A assumed to be parallel to the plane of the car wheel in its normal straight-ahead running position. Such an orientation of axis A—A and plane G—G is not exactly necessary, but is desirable, and provides a convenient reference frame for this discussion.

Now the same pre-loading of the unit, as described above, to exert force F against arm 60 can be obtained wholly by making the length of arm 60 (or the location of the axis of shaft 62) such that, in the medial position, the center of roller 17 lies somewhat to the left of G—G; and by mounting the grommets 51, as for instance in Fig. 5b, symmetrically so that, if uninfluenced by arm 60, the roller end of the unit would swing along line G—G. Or, as is shown specifically in Fig. 5, the pre-loading to produce the force F may be had by a combination of both described methods, by arranging the grommet mountings to produce a given part of the desired pre-loading force, and by setting shaft 62 or the length of arm 60 such as to produce a further pre-loading force. This and the other pre-loading arrangements described above, may all be summarized by saying: with a grommet mounting which resiliently resists swinging of unit 10, in the plane of A—A, away from the plane (such as G—G) in which the unit would, uninfluenced, swing about A—A, that swinging arm 60 is so arranged that in its medial position (which is here shown preferably as being in the plane of A—A) it forces unit 10 out of that normal swinging plane G—G in a direction away from the swinging axis of the arm.

Referring further to the mounting on axis A—A specifically shown in Fig. 5, where right-hand spacer sleeve 46 is shorter than the left-hand one; the lengths of the grommet ferrules may be such that the ferrule heads, held between the nuts and the spacer sleeves, will just snugly engage the grommets when they are in uncompressed condition. It is, however, desirable to space the ferrule heads somewhat further apart so that, when the unit has swung clockwise in Fig. 5 to a position where the illustrated grommet compressions are relieved, further swinging in that direction does not cause immediate reversal of the grommet compressions.

The effect of the force F is seen from a consideration of Fig. 3a. In the medial position of arm 60 force F is directed substantially radially of the arm and consequently has no component acting at point 64 at a right angle to the arm. As the traction roller rises, a relatively increasing component of force F tends to rotate the arm clockwise, against the increasing spring force tending to rotate the arm counter-clockwise. On the downward movement of the roller and arm the component of F then tending to rotate the arm counter-clockwise acts with the decreasing spring force. Thus, the action of the pre-load force F is to the effect of opposing the spring force as it increases, and acting with it as it decreases. In the particular arrangement and design shown in Fig. 5, where the dimensional scale may be set up by taking the distance from A—A to P—P to be 24 inches, and with torsion spring 66 exerting a force counter-clockwise (in Fig. 3) of about 45 lbs. at point 64 in the median position of arm 60, spring 66 being torsionally stressed by a twist of about 90°, the following settings of the various elements have produced a nearly uniform effective traction pressure of roller 17 on the car wheel throughout a normal range of about two and one-half inches above and below median. Spacer sleeve 46, at the right hand in Fig. 5, is about one-quarter inch shorter than sleeve 46 at the left. Headed grommet sleeves 53 are of such length that, when contacting endwise, heads 52 just snugly hold the grommets endwise when the grommets are under no longitudinal compression. Nuts 54 are set down on bolts 44 to hold the headed sleeves tightly between them and spacer sleeves 46. That setting, in and of itself, would cause the roller end of the axis of unit 10 to lie closer to shaft 62 than the generator end of the unit axis. Grommets 51 are of medium soft rubber and, uncompressed, they extend endwise beyond mounting lugs 50 about one-quarter inch. The effective length of arm 60 is about eleven inches, and the axis of shaft 62 is located so that arm 60 holds the roller end of the unit 10 axis about 0.375" further away from shaft 62 than the unit axis at the generator end.

Such a set up has the advantage that the rubber grommet mounting of the unit is always snugly held endwise, and, as explained, the effective traction force is kept substantially uniform.

Reference has been made to cowl 48 that spacedly surrounds generator housing 11. As shown in preferred arrangement in the drawings, cowl 48 extends inwardly from mounting plate 40 preferably only far enough to surround about the outer half of that housing. As before explained, the cowl is integrated with plate 40 and also includes the spacer sleeves 46 in its formation. At one side it has an opening 48a into a junction box 48b (see Fig. 2) to accommodate the generator output lines 14.

The outer end of generator shaft 22 is equipped, as with a coarse thread 22a, to carry the hub 70 of a blower element 72. Element 72 is formed with a series of radial blower blades 74 integral with and surrounding hub 70 and formed integrally with the body 76 of a sheave formation 78 through which the blower, and the generator, may be driven from an auxiliary source of power when the car is standing; for instance to furnish power for air circulation in a cooling system normally powered by generator operation from the car wheel when the car is running. The sheave body is open in its center at 80 to allow free ingress of air to the spaces between the inner edges of blades 74. When set on the generator shaft, blades 74 of the blower element, accommodated by an opening 82 in plate 40, lie wholly or substantially so, inside the inner face of plate 40. Rotation of the blower element when the generator is being driven by auxiliary power draws air in through the hollow sheave formation and through the open central part 80 to the blades, which throw the air out centrifugally at the outer end of the generator. That outer generator end is spaced inwardly from plate 40 as shown. The air thrown out in that space is directed inwardly over the generator by cowl 48 to cool the generator. When the generator is being driven from the running car wheel with the blower element removed, the air stream due to car travel flows over the uncovered inner part of the generator to keep the generator cooled.

When the generator is to be driven by auxiliary power, traction roller 17 is lifted through arm 60, by lifting a manual lever 80 to rotate shaft 62 clockwise, the lever being hung up in its lifted position on a lug 82. In its lower position (Fig. 1) lever 80 rests on cowl 48 and in that position it frees shaft 62. Shaft 62 has a hood-shaped lug 62a under which lever 80 has its hook-shaped end 80a hooked over the shaft. In its lower position lever 80 does not engage 62a, having to be lifted somewhat to engage that lug. Then further lifting of 80 rotates shaft 62 and lifts arm 60 and the traction roller.

As before stated, the structure and functions of traction roller 17 are similar to the showings of Patent No. 2,519,170. If car wheel 30 moves to the left in Fig. 4 far enough that its tread moves out of contact with the tread 17a of roller 17, the cone formation 17b at the left end of the roller climbs the car wheel tread as that wheel moves back to the right. If the car wheel moves toward the right in Fig. 4 far enough to bring the wheel flange under the roller tread, the conical formation climbs the flange. If in further movement toward the right the wheel flange moves from under the roller tread, a shoe 86, attached to shaft housing 16 then temporarily rides the flange. Shoe 86 is removably and replaceably secured by bolts 87 to lugs 88 which are welded to the shaft housing. And if in swivelling the car wheel moves so far to the left in Fig. 4 (to the right in Fig. 1) as to lose effective contact with cone 17b, then lug 62a coming down on lever 80 supports the traction roller in a position to properly re-engage the car wheel by the cone climbing the tread.

We claim:

1. A power take-off mechanism for vehicles such as railroad cars having a car structure and a wheel-and-axle element; said mechanism comprising a take-off unit which includes a power take-off shaft, a shaft carrier on which the shaft is journalled and of a length substantially co-extensive with the length of the shaft, a power take-off element mounted on one end of the shaft and adapted to take power from a wheel-and-axle element, power transmission means driven by the other end of the shaft, primary mounting means for the unit on the car structure comprising means which forms a substantially fixed physical suspension axis on which the shaft carrier is swingingly suspended near its second mentioned end and to which axis the swinging movement of the unit is substantially positively confined by said primary mounting means, said suspension axis being substantially at right angles to the axis of the normally positioned wheel and axle element and to the axis of the take-off shaft and lying substantially in a plane which is non-radial with respect to the wheel and axle element, said suspension means including elements of rubber-like nature allowing, by distortion of said material, a limited swinging movement of the unit, opposed by the distortion forces, in a plane determined by the suspension axis and the axis of the take-off shaft, and secondary mounting means for the unit comprising a guiding arm pivotally mounted with respect to the car structure on an axis lying substantially parallel to the axis of the normally positioned wheel-and-axle element, lying substantially in the plane determined by the suspension axis, and spaced from the axis of the take-off shaft, the free end of said arm being pivotally connected to the shaft carrier at a point removed from its second mentioned end, all so that, upon swinging movement of the unit about the primary mounting axis, swinging movement in said defined plane is forced by said pivoted guiding arm and said swinging movement is accompanied by opposing distortion forces set up in said rubber-like elements.

2. A power take-off mechanism as defined in claim 1, and including also spring means urging the guiding arm swingingly in a direction to apply power take-off tractive force to the take-off element.

3. A power take-off mechanism as defined in claim 2, and in which the length of the guiding arm and the location of its pivot axis are such that when the arm lies substantially in the plane determined by the suspension axis, the first mentioned end of the shaft carrier and shaft is forced away from the pivot axis of the arm with accompanying distortion of the rubber-like suspension elements.

4. A power take-off mechanism as defined in claim 1, and in which the suspension means comprises suspension members affixed to the shaft carrier near its second mentioned end on an axis substantially at right angles to the axis of the take-off shaft, mounting members affixed to the car structure on an axis lying substantially at right angles to the axis of the wheel-and-axle element, and rubber-like elements interposed between the mounting members and the suspension members, whereby the unit is suspended on said axis exclusively by support through said rubber-like elements.

5. A power take-off mechanism as defined in claim 1 and in which the suspension means comprises a mounting plate secured to the car structure in a vertical plane substantially at right angles to the axis of the wheel-and-axle unit, two mounting bolts mounted on said plate and projecting laterally therefrom in spaced positions in a plane which is substantially parallel to the axis of the wheel-and-axle element, spacer sleeves integrated with the plate and surrounding the bolts, two perforate mounting lugs affixed to the shaft carrier near its second mentioned end in spaced relation at opposite sides of the shaft axis and arranged on an axis substantially at right angles to the shaft axis, rubber-like grommets fitted in the mounting lugs and having perforations whose axes lie parallel to the shaft axis and take the projecting mounting bolts, the rubber grommets extending beyond the ends of the mounting lugs, and means forming confining heads on the bolt ends confining the grommets between them and the spacer sleeves.

6. A power take-off mechanism as defined in claim 5 and also including spring means urging the guiding arm swingingly in a direction to apply power take-off tractive force to the take-off element, and in which the length of the guiding arm and the location of its pivot axis are such that when the arm lies substantially in the plane determined by the suspension axis, the first mentioned end of the shaft carrier and shaft is forced away from the pivot axis of the arm with accompanying distortion of the rubber-like grommets by compression of those grommets end wise against a spacer sleeve and a confining head.

7. A power take-off mechanism for vehicle such as railroad cars having a car structure and a wheel-and-axle element, said mechanism comprising a take-off unit which includes a power take-off shaft, an elongated shaft carrier substantially coextensive with the shaft and on which the shaft is journalled, a traction roller mounted on one end of the shaft at the corresponding end of the shaft carrier, a generator housing integrated with an extending lengthwise from the other end of the shaft carrier, a generator carried in the generator housing and having a rotor shaft forming a co-axial extension of the take-off shaft, the center of mass of the unit, and the neutral suspension point of the unit with reference to concussion applied to the traction roller, both lying close to the generator, and means for suspending the unit on the car structure on a swinging axis which lies substantially at right angles to the axis of the shaft and close to the neutral suspension point.

8. A power take-off mechanism as defined in claim 7 and in which the suspension means includes rubber-like mounting elements through which the complete suspension of the unit is effected.

9. A power take-off mechanism as defined in claim 7 and in which the suspension means includes a mounting plate secured to the car structure in a vertical plane substantially at right angles to the axis of the wheel-and-axle element, means forming a swinging axis support for the unit with its swinging axis substantially parallel to said mounting plate and with the end of the generator housing spaced from said plate, and ventilating means for the generator including an opening through said plate aligned with the generator rotor shaft and that shaft projecting beyond the end of the generator housing and having a formation for taking a rotary driving member, a rotary driving member taken by said formation, and said rotary driving member including a centrifugal air fan with blades located in the space between the generator housing and the mounting plate, said ventilating means including also a cowl projecting from the mounting plate and spacedly surrounding a part of the length of the generator housing.

10. A power take-off mechanism for vehicles such as railroad cars having a car structure and a wheel-and-axle element, said mechanism comprising a take-off unit which includes a power take-off shaft, an elongate shaft carrier substantially coextensive with the shaft and on which the shaft is journalled, a traction roller mounted on one end of the shaft at the corresponding end of the shaft carrier, a generator housing integrated with and extending lengthwise from the other end of the shaft carrier, a generator carried in the generator housing and having a rotor shaft forming a co-axial extension of the take-off shaft; and suspension and ventilating means for the take-off unit including a mounting plate secured to the car structure in a vertical plane substantially at right angles to the axis of the wheel-and-axle element, means forming a swinging axis support for the unit with its swinging axis substantially parallel to said mounting plate and with the end of the generator housing spaced from said plate, and ventilating means for the generator including an opening through said plate aligned with the generator rotor shaft and that shaft projecting beyond the end of the generator housing and having a formation for taking a rotary driving member, and said rotary driving member including a centrifugal air fan with blades located in the space between the generator housing and the mounting plate, and including also a cowl projecting from the mounting plate and spacedly surrounding a part of the length of the generator housing.

11. A power take-off mechanism for vehicles such as railroad cars having a car structure and a wheel-and-axle element, said mechanism comprising a take-off unit which includes a power take-off shaft, an elongate shaft carrier substantially coextensive with the shaft and on which the shaft is journalled, a traction roller mounted on one end of the shaft at the corresponding end of the shaft carrier, a generator housing integrated with and extending lengthwise from the other end of the shaft carrier, a generator carried in the generator housing and having a rotor shaft forming a co-axial extension of the take-off shaft, a mounting plate secured to the car structure in a vertical plane substantially at right angles to the axis of the wheel-and-axle element, means suspending the take-off unit in a position with its shaft axis substantially parallel to the wheel-and-axle axis and with the end of the generator housing adjacent to but spaced inwardly from the mounting plate, and ventilating means for the generator including an opening through said plate aligned with the generator rotor shaft and that shaft projecting beyond the end of the generator housing and having a formation for taking a rotary driving member, and said rotary driving member including a centrifugal air fan with blades located in the space between the generator housing and the mounting plate, and including also a cowl projecting from the mounting plate and spacedly surrounding a part of the length of the generator housing.

References Cited in the file of this patent

UNITED STATES PATENTS

| | | |
|---|---|---|
| 1,002,191 | Apple | Aug. 29, 1911 |
| 2,074,136 | Welch | Mar. 16, 1937 |
| 2,450,422 | Elks | Oct. 5, 1948 |
| 2,567,504 | Beemer | Sept. 11, 1951 |